United States Patent [19]

Randall

[11] Patent Number: 5,001,564
[45] Date of Patent: Mar. 19, 1991

[54] VERTICAL PHASE ADJUST CIRCUIT

[75] Inventor: Jennifer L. Randall, Lancaster, Pa.

[73] Assignee: Burle Technologies, Inc., Wilmington, Del.

[21] Appl. No.: 395,489

[22] Filed: Aug. 18, 1989

[51] Int. Cl.$^5$ .............................................. H04N 5/04
[52] U.S. Cl. .................................... 358/149; 358/148
[58] Field of Search ............... 358/148, 158, 150, 151, 358/149

[56] References Cited

U.S. PATENT DOCUMENTS

| | | | |
|---|---|---|---|
| 3,761,627 | 9/1973 | Schneider | 358/149 |
| 4,012,592 | 3/1977 | Ricard | 358/150 |
| 4,025,951 | 5/1977 | Eckenbrecht | 358/158 |
| 4,228,461 | 10/1980 | Weissmueller | 358/148 |
| 4,383,273 | 5/1983 | Lunn | 358/148 |
| 4,498,103 | 2/1985 | Aschwanden | 358/149 |
| 4,556,905 | 12/1985 | Ikejiri | 358/154 |
| 4,568,976 | 2/1986 | Trammell | 358/150 |
| 4,614,973 | 9/1986 | Sorenson | 358/155 |
| 4,694,256 | 9/1987 | Kawamura | 358/155 |
| 4,791,488 | 12/1988 | Fukazawa | 358/149 |

Primary Examiner—James J. Groody
Assistant Examiner—Harvey David E.
Attorney, Agent, or Firm—Martin Fruitman

[57] ABSTRACT

A vertical phase adjust circuit with high noise immunity for line locked surveillance cameras. To prevent noise from the AC line producing false output signals, a counter is used to lock out the delayed vertical line locked output signal. The horizontal scan frequency is counted from the time a vertical output is produced, and the vertical output signal is prevented until 98 percent of the period between legitimate vertical signals has elapsed. The circuit also includes a lock detect circuit to increase the time window during startup conditions to assure initial synchronization and an increased phase adjust range to permit synchronization with any other camera.

3 Claims, 2 Drawing Sheets

VERTICAL PHASE ADJUST CIRCUIT

SUMMARY OF THE INVENTION

This invention deals generally with TV cameras and more specifically with noise reduction in vertical synchronization circuitry.

A common problem among vertical phase adjust circuits is their susceptibility to power line noise. This is particularly a problem with circuits which include integrated circuit gate arrays because such gate arrays generally operate on lower voltage signals so that they are more sensitive to noise to which previous circuit components were immune. Furthermore, most vertical phase adjust circuits have another deficiency in that they have only a limited degree of phase adjustment. This limited phase adjustment, typically about 300 degrees, may make it difficult to exactly synchronize one camera with another.

The present invention solves both of these problems by furnishing a vertical phase adjust circuit which is adjustable for a full 360 degrees and also is highly immune to line generated noise.

Essentially, the noise immunity is attained by preventing the phase adjust circuit from generating another output signal for an appreciable time after it has generated an output. Since, for any given TV system, the period between legitimate vertical synchronizing signals is fixed, the present invention blocks all output signals from the vertical phase adjust circuit for most of that period, and thus produces a small "window" during which legitimate delayed vertical output signals can be expected. In the preferred embodiment the output signal is locked out for approximately 98 percent of the period between legitimate signals, thus reducing the likelihood of random noise initiating a vertical synchronization signal to only two percent of what it would otherwise be.

This operating window is created by using the horizontal frequency generated within every TV system as a basic timing signal. An integrated circuit ripple counter is used to count horizontal periods after a vertical output, and after a specific number of them, the circuit which disables the output of the phase adjust circuit is itself turned off. In the preferred embodiment, for a NTSC system which has 262.5 horizontal periods within a normal vertical period, the ripple counter is set for 256 counts. It is these numbers which provide the lock-out ratio of 98 percent.

Such a lock-out circuit does, however, raise another problem which the present invention also solves. When a TV system is first turned on the camera is, of course, not immediately in synchronization with the system and the small window provided by the lock-out circuit may not be sufficient to permit initial synchronization. The present invention, therefore, includes a circuit which furnishes a larger synchronization window until the system has become synchronized, at which time it changes to the previously mentioned two percent window. This change in the length of the lock-out time is accomplished very simply by changing to a lesser count output on the ripple counter, and for the preferred embodiment the change is to a lock-out period of 128 horizontal periods. This changes the signal window to approximately 50 percent of the vertical period.

The present invention also permits a full 360 degree phase adjustment to facilitate the synchronization of the camera to other cameras. Such a circuit must, however, include provisions to assure that the phase adjustment will not surpass 360 degrees, because phase adjustment greater than 360 degrees would cause the camera to lose synchronization with the system. The present invention furnishes such a limiting circuit and does so with standard integrated circuit components by ensuring that any given vertical pulse is not delayed beyond the start of the next vertical pulse.

This invention therefore furnishes a compact and inexpensive vertical phase control system which not only includes full 360 degree adjustment with provision to prevent too great an adjustment, but also yields superior noise immunity and accommodates to the special synchronization problems of system startup.

DETAILED DESCRIPTION OF THE INVENTION

Figure 1:
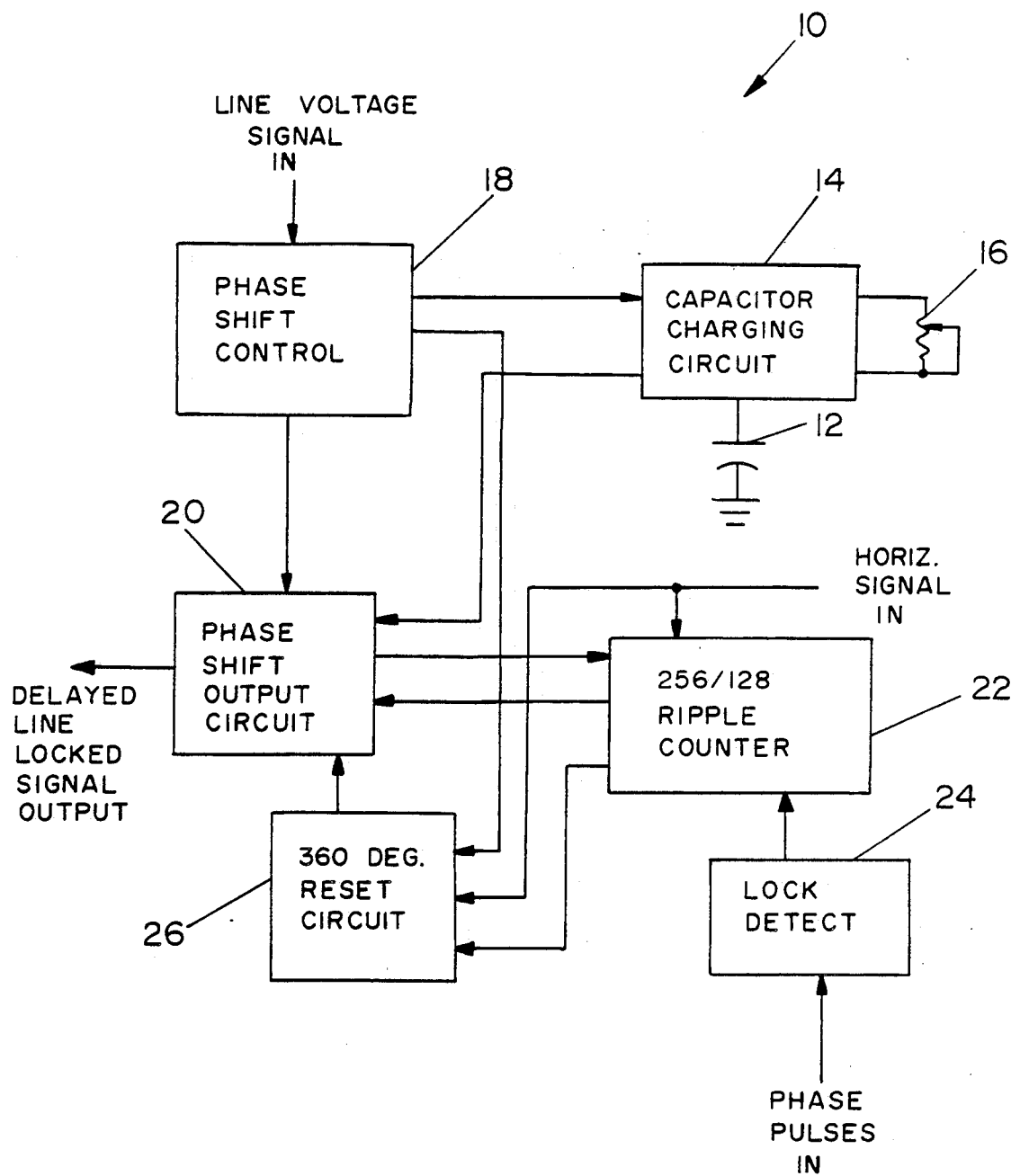
FIG. 1 is a simplified block diagram of the preferred embodiment of the invention.

The preferred embodiment of the invention is shown in FIG. 1 in simplified block diagram form to better introduce the basic circuit and its operation. In FIG. 1 vertical phase adjustment circuit 10 is composed of capacitor 12 which is charged by capacitor charging circuit 14. The charging time of capacitor 12 is determined by the setting of variable resistor 16. As is conventional in most vertical phase adjustment circuits, it is the charging time of capacitor 12 which determines the delay for the vertical frequency of the TV camera within which it is installed. In this circuit, as in most others, a particular voltage level to which capacitor 12 becomes charged triggers a switching device which discharges the capacitor producing a sawtooth waveform. In the preferred embodiment, the discharge switching device is a transistor, and another transistor circuit, controlled by resistor 16, provides a linear charging rate for capacitor 12.

The timing for the voltage charging capacitor 12 originates from the power line voltage being fed to phase shift control circuit 18 which controls both the constant current generator charging capacitor 12 and the transistor discharging the capacitor.

The waveform produced by the charging and discharge of capacitor 12 is fed to phase shift output circuit 20 where it triggers a flip-flop circuit to produce an output pulse synchronized to the input line voltage but delayed according to the setting of resistor 16.

As described to this point, the circuit is quite conventional, but such a conventional circuit is clearly susceptible to any noise signal which comes in on the line voltage signal line. Any noise signal, such as that caused by a motor starting on the AC line, can produce an erratic and undesirable additional delayed vertical output signal pulse. The present invention, however, virtually eliminates that possibility.

As discussed above, this is accomplished with a lock-out circuit which prevents output signals for all but the very short time when the proper output signal is expected. To do this the output from phase shift output circuit 20 also starts ripple counter 22 which counts the cycles of the horizontal frequency of the system, and the output of phase shift output circuit 20 is not cleared until the ripple counter completes its prescribed count.

This count is typically set for 256, so that output circuit 20 is not able to produce another output signal until 257 of the usual 262.5 horizontal cycles in one vertical cycle have been counted. False signals are therefore prevented for approximately 98 percent of the operating time of the circuit.

Unfortunately, when a system is first started and the horizontal frequency generator is not stable, the operating window open based on an unstable frequency is not wide enough to assure that the system will synchronize, so a circuit is included in the invention which will permit synchronization at startup and at any other time that the system might lose synchronization.

This circuit is lock detect circuit 24. It receives the phase pulses signal from the vertical phase comparator (not shown) within the TV system. The phase pulses signal is present only when the vertical system is not synchronized so it can be used to indicate the requirement for a larger operating window. Lock detect circuit 24 processes the phase pulses signal and controls ripple counter 22 to change the count from 256 to 128. This decrease in the time for which an output signal is locked out permits synchronization in even the worst cases. Then, when synchronization is established, the phase pulses signal stops and lock detect circuit 24 re-establishes the higher count and the smaller operating window.

The other additional circuit in the present invention is 360 degree reset circuit 26. In order to assure that the vertical phase adjust delay is not greater than the maximum 360 degree adjustment and does not cause loss of synchronization, 360 degree reset circuit 26 processes a signal from phase shift control circuit 18 and counter 22 to determine when a 360 degree reset is necessary. It then triggers output circuit 20 and restarts the charging of capacitor 12 regardless of the state of phase shift control circuit 18.

Figure 2:
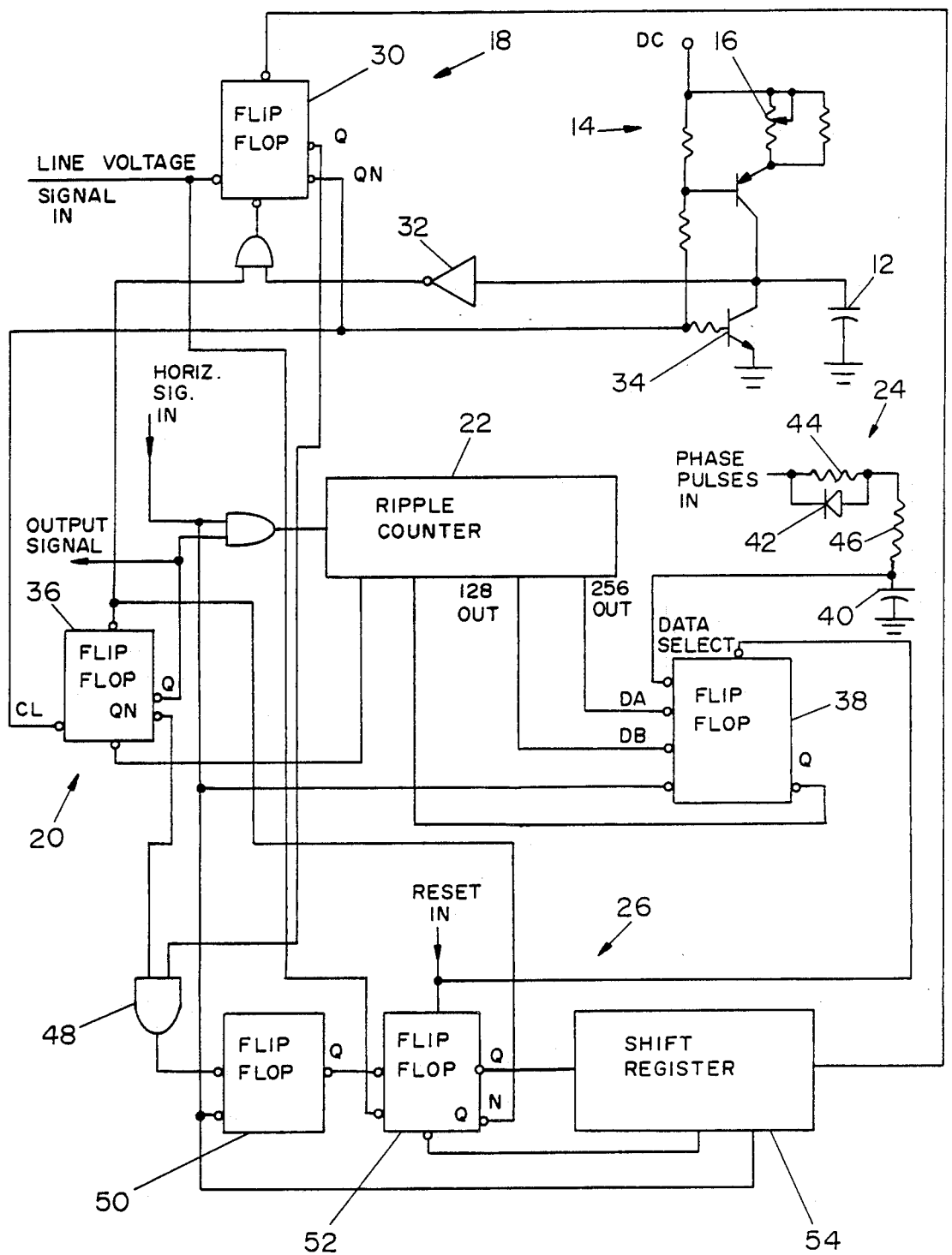
FIG. 2 is a more detailed circuit diagram of the preferred embodiment of the invention.

FIG. 2 is a more detailed circuit diagram of the preferred embodiment of the invention. It may be used with the following description to better understand the configuration and the operation of the various aspects of the invention.

The line voltage signal fed to phase shift control circuit 18 at flip-flop 30 is already clipped or attenuated to the appropriate voltage of 0 to 5 volts. When this input signal goes high, flip-flop 30-QN goes low, turning on constant current capacitor charging circuit 14 and linearly charging capacitor 12. When the voltage on capacitor 12 reaches the threshold voltage of device 32 it will reset flip-flop 30, and 30-QN will go high. The length of time it takes for capacitor 12 to reach the threshold voltage of device 32 determines the vertical phase delay. This time can be varied from several microseconds to greater than 16.67 milliseconds by adjusting resistor 16. The high voltage at 30-QN will turn off charging circuit 14 and discharge capacitor 12 through transistor 34. The high at 30-QN will also clock flip-flop 36 sending 36-Q, which is the delayed line locked output signal, high.

Once 36-Q goes high it is known that another valid clock signal will not be present for 262.5 horizontal cycles (when the system is using 60 Hz). Thus, if 36-Q is forced to remain high for almost 262 horizontal cycles, another clock pulse, whether false or not, will be disregarded. To accomplish this, when 36-Q goes high, it enables a counter 22 for which the clock frequency is the horizontal camera frequency. When counter 22 reaches a count of 256, flip-flop 38 is fed a high on 38-DA and the 257th clock pulse will cause 38-Q to go high, resetting counter 22 and clearing flip-flop 36. Therefore, 36-Q is low again and is ready to be sent high by the next line locked pulse.

The numbers used in the preferred embodiment, 256 and 128 for the counter for a NTSC system with 262.5 horizontal cycles within a vertical cycle, are of course subject to design choice, so that a higher number for the counter will improve the noise immunity even more.

When the camera is not synchronized, for instance during startup, the horizontal frequency will not be exactly 15.75 kHz as in normal operation, and if it is too much less than 15.75 kHz, the time it takes to count 256 horizontal cycles will exceed one vertical period. Under these circumstances the delayed output signal would have a frequency of only 30 Hz instead of the proper 60 Hz, and the camera would never be able to synchronize. Lock detect circuit 24 overcomes this problem.

Lock detect circuit 24 determines when the vertical is not synchronized and then decodes counter 22 at a count of 128 rather than at 256. When the camera becomes synchronized, lock detect circuit 24 returns the count decoding to 256.

The signal for lock detect circuit 24 is derived from the phase pulses signal which is received from the vertical phase comparator (not shown). The phase pulses signal is low during the time an error signal is being applied to the camera's voltage controlled oscillator (not shown) and high when no error voltage is being applied. The phase pulses signal is low-pass filtered to create the lock detect signal.

Two conditions must be met by the lock detect signal. They are (1) the lock detect signal must not go high until the camera is thoroughly synchronized and (2) the lock detect signal must go low as soon as possible if the camera loses synchronization for any reason. Both of these conditions are met if different time constants are used for the charging and discharging of capacitor 40. This is accomplished by placing diode 42 in parallel with one of the charging resistors 44. Thus, capacitor 40 is charged slowly through both resistors 44 and 46, but discharged essentially through only resistor 46.

360 degree reset circuit 26 assures that the preferred embodiment of the invention, while permitting full 360 degree vertical phase delay, does not surpass the 360 degree limit and lose synchronization. The reset circuit consists of AND gate 48, flip-flops 50 and 52, and shift register 54.

If flip-flop 30-Q is high because capacitor 12 has not yet charged to the threshold voltage of device 32 and flip-flop 36-QN is high because the operating window is open, the output of AND gate 48 will be high. If this condition persists to within one horizontal period before the next line signal input will occur, then the 360 reset circuit will be set by flip-flop 50-Q going high. When the next line signal input does occur flip-flop 52-QN goes low setting flip-flop 36 and resetting flip-flop 30. The high at flip-flop 52-Q is then clocked at the horizontal frequency through three bit shift register 54. When the high reaches the second bit, a signal output is generated to reset flip-flop 52 and to remove the reset and set on flip-flops 30 and 36. Then when the high reaches the third bit, a signal output is generated to trigger flip-flop 30 again allowing the constant current source to begin charging capacitor 12, thus restarting the delay cycle.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed as new and for which Letters Patent of the United States are desired to be secured is:

1. In a vertical phase adjustment circuit for TV cameras comprising a capacitor receiving current from a capacitor charging circuit which is synchronized with the power line from which the capacitor charging circuit receives power, a capacitor discharge circuit acting upon the capacitor, and a delayed signal output circuit whose output signal is delayed relative to the start of the capacitor charging by a variable time related to the time after start of the charging that the capacitor reaches a specified voltage level, and in which the capacitor discharge occurs approximately simultaneous with the delayed output signal the improvement comprising:

a lock out circuit which prevents the delayed signal output circuit from producing a second output signal for a specified time after the generation of the first output signal; and a lock detect circuit interconnected with and controlling the lock out circuit so that the lock out circuit operates for a shorter time period when the vertical signal of a camera is not synchronized than when the vertical signal of the camera is synchronized, and wherein the lock detect circuit is interconnected with and receives an input signal from a vertical phase comparator, sends that signal through a low pass filter and uses it to charge and discharge a capacitor, the capacitor being discharged at a faster rate than the rate at which it is charged, with the capacitor voltage operating a circuit which is interconnected with and sends a signal to the lock out circuit to change the period of time for which the lock out circuit operates.

2. In a vertical phase adjustment circuit for TV cameras comprising a capacitor receiving current from a capacitor charging circuit which is synchronized with the power line from which the capacitor charging circuit receives power, a capacitor discharge circuit acting upon the capacitor, and a delayed signal output circuit whose output signal is delayed relative to the start of the capacitor charging by a variable time related to the time after start of the charging that the capacitor reaches a specified voltage level, and in which the capacitor discharge occurs approximately simultaneous with the delayed output signal the improvement comprising:

a lock out circuit which prevents the delayed signal output circuit from producing a second output signal for a specified time after the generation of the first output signal; and a reset circuit which operates automatically at a specified time after a first output signal is generated and resets the delayed signal output circuit so that the delay of the output signal may not exceed the specified time which is not greater than the time period expected between legitimate vertical signals.

3. In a vertical phase adjustment circuit for TV cameras comprising a capacitor receiving current from a capacitor charging circuit which is synchronized with the power line from which the capacitor charging circuit receives power, a capacitor discharge circuit acting upon the capacitor, and a delayed signal output circuit whose output signal is delayed relative to the start of the capacitor charging by a variable time related to the time after start of the charging that the capacitor reaches a specified voltage level, and in which the capacitor discharge occurs approximately simultaneous with the delayed output signal the improvement comprising:

a reset circuit which operates automatically at a specified time after a first output signal is generated and resets the delayed signal output circuit so that the delay of the output signal may not exceed the specified time which is not greater than the time period expected between legitimate vertical signals.

* * * * *